(12) United States Patent
Hennelly et al.

(10) Patent No.: US 9,904,360 B2
(45) Date of Patent: Feb. 27, 2018

(54) HEAD TRACKING BASED GESTURE CONTROL TECHNIQUES FOR HEAD MOUNTED DISPLAYS

(71) Applicant: Kopin Corporation, Westborough, MA (US)

(72) Inventors: Sean Hennelly, West Bridgford (GB); Nathan Andrews, West Bridgford (GB)

(73) Assignee: Kopin Corporation, Westborough, MA (US)

( * ) Notice: Subject to any disclaimer, the term of this patent is extended or adjusted under 35 U.S.C. 154(b) by 0 days.

(21) Appl. No.: 14/540,974

(22) Filed: Nov. 13, 2014

(65) Prior Publication Data

US 2015/0138074 A1     May 21, 2015

Related U.S. Application Data

(60) Provisional application No. 61/905,088, filed on Nov. 15, 2013.

(51) Int. Cl.
| | |
|---|---|
| *G09G 5/00* | (2006.01) |
| *G06F 3/01* | (2006.01) |
| *G06F 3/0482* | (2013.01) |
| *G06F 3/0484* | (2013.01) |
| *G06F 3/0486* | (2013.01) |
| *G06F 3/0481* | (2013.01) |

(52) U.S. Cl.
CPC ............. *G06F 3/012* (2013.01); *G06F 3/017* (2013.01); *G06F 3/0482* (2013.01); *G06F 3/0486* (2013.01); *G06F 3/04812* (2013.01); *G06F 3/04842* (2013.01)

(58) Field of Classification Search
CPC ........ G06F 3/012; G06F 3/017; G06F 3/0482; G06F 3/04842
See application file for complete search history.

(56) References Cited

U.S. PATENT DOCUMENTS

| | | |
|---|---|---|
| 4,836,670 A | 6/1989 | Hutchinson |
| 5,633,993 A | 5/1997 | Redmann |
| 5,999,895 A | 12/1999 | Forest |

(Continued)

FOREIGN PATENT DOCUMENTS

| | | |
|---|---|---|
| EP | 2 098 947 | 9/2009 |
| WO | WO 2015/073869 | 5/2015 |

(Continued)

OTHER PUBLICATIONS

International Search Report and Written Opinion of PCT/US2014/065778 dated Mar. 4, 2015 entitled "Text Selection Using HMD Head-Tracker and Voice-Command".

(Continued)

*Primary Examiner* — Peter D McLoone
(74) *Attorney, Agent, or Firm* — Hamilton, Brook, Smith & Reynolds, P.C.

(57) ABSTRACT

A head gesture-based recognition system in Headset Computers (HSC) is disclosed. Notification dialogue boxes can be acknowledged by head nodding or ticking movement in the user interface. Question dialog boxes can be assured by head nods or head shakes in the user interface. Head swiping is also a recognizable form of user input through a head tracker of the HSC. Progress indicators and other visual display feedback are utilized.

16 Claims, 7 Drawing Sheets

(56) References Cited

U.S. PATENT DOCUMENTS

| | | | |
|---|---|---|---|
| 6,084,556 A | 7/2000 | Zwern | |
| 6,100,871 A | 8/2000 | Min | |
| 6,124,843 A | 9/2000 | Kodama | |
| 6,131,864 A | 10/2000 | Schumann | |
| 6,278,975 B1 | 8/2001 | Brant et al. | |
| 7,403,898 B2* | 7/2008 | Slemmer | G10L 15/26 704/275 |
| 7,429,108 B2* | 9/2008 | Rosenberg | G06F 3/013 351/209 |
| 7,489,297 B2 | 2/2009 | Hohmann | |
| 8,643,951 B1 | 2/2014 | Wheeler | |
| 8,745,058 B1 | 6/2014 | Garcia-Barrio | |
| 8,830,165 B1* | 9/2014 | Heath | G06F 17/273 345/156 |
| 8,929,954 B2* | 1/2015 | Jacobsen | G06F 3/167 455/563 |
| 9,122,307 B2* | 9/2015 | Jacobsen | G06F 3/011 |
| 9,141,197 B2* | 9/2015 | MacDougall | H04M 1/72519 |
| 9,235,272 B1* | 1/2016 | Brooks-Heath | G06F 17/273 |
| 9,292,084 B2* | 3/2016 | Abdollahi | A42B 3/042 |
| 9,311,718 B2* | 4/2016 | Scavezze | G06T 7/20 |
| 9,383,816 B2* | 7/2016 | Hennelly | G02B 27/0101 |
| 9,423,827 B2* | 8/2016 | Compton | G06F 1/1632 |
| 9,500,867 B2* | 11/2016 | Hennelly | G02B 27/0101 |
| 2006/0041433 A1 | 2/2006 | Slemmer et al. | |
| 2006/0256083 A1* | 11/2006 | Rosenberg | G06F 3/013 345/156 |
| 2008/0114603 A1 | 5/2008 | Desrochers | |
| 2008/0316212 A1 | 12/2008 | Kushler | |
| 2009/0002325 A1 | 1/2009 | Jha | |
| 2009/0228842 A1 | 9/2009 | Westerman | |
| 2009/0243967 A1 | 10/2009 | Kato | |
| 2010/0235726 A1 | 9/2010 | Ording et al. | |
| 2011/0187640 A1 | 8/2011 | Jacobsen et al. | |
| 2012/0035934 A1 | 2/2012 | Cunningham | |
| 2012/0127082 A1 | 5/2012 | Kushler | |
| 2012/0235902 A1* | 9/2012 | Eisenhardt | A42B 3/042 345/156 |
| 2012/0236025 A1 | 9/2012 | Jacobsen et al. | |
| 2013/0006957 A1* | 1/2013 | Huang | G06F 3/017 707/706 |
| 2013/0141360 A1 | 6/2013 | Compton et al. | |
| 2013/0147836 A1 | 6/2013 | Small | |
| 2013/0169532 A1 | 7/2013 | Jahnke | |
| 2013/0188032 A1* | 7/2013 | Vertegaal | G06F 3/011 348/78 |
| 2013/0271360 A1 | 10/2013 | MacDougall et al. | |
| 2013/0288753 A1 | 10/2013 | Jacobsen et al. | |
| 2013/0300661 A1 | 11/2013 | Ezra | |
| 2014/0049463 A1 | 2/2014 | Seo | |
| 2014/0195918 A1* | 7/2014 | Friedlander | G06F 3/04842 715/727 |
| 2014/0358536 A1* | 12/2014 | Choi | G10L 15/26 704/235 |
| 2015/0138073 A1* | 5/2015 | Hennelly | G02B 27/0101 345/156 |
| 2015/0138084 A1* | 5/2015 | Hennelly | G02B 27/0101 345/157 |
| 2015/0142440 A1 | 5/2015 | Parkinson et al. | |
| 2015/0206321 A1* | 7/2015 | Scavezze | G06T 7/20 345/633 |
| 2015/0212684 A1* | 7/2015 | Sabia | G06Q 10/109 715/739 |
| 2015/0220142 A1* | 8/2015 | Parkinson | G06F 3/0482 345/157 |
| 2015/0227209 A1* | 8/2015 | Nicholson | G06F 3/005 345/156 |
| 2015/0331492 A1* | 11/2015 | Woo | G06K 9/00268 345/156 |

FOREIGN PATENT DOCUMENTS

| | | |
|---|---|---|
| WO | WO 2015/073874 | 5/2015 |
| WO | WO 2015/073879 | 5/2015 |
| WO | WO 2015/073880 | 5/2015 |

OTHER PUBLICATIONS

International Search Report and Written Opinion of PCT/US2014/065771 entitled "Automatic Speech Recognition (ASR) Feedback for Head Mounted Displays (HMD)" dated Feb. 5, 2015.

International Search Report and Written Opinion of PCT/US2014/065787 entitled "Head Tracking Based Gesture Control Techniques for Head Mounted Displays" dated Feb. 9, 2015.

International Search Report and Written Opinion for PCT/US2014/065788 dated Feb. 26, 2015 entitled "Head-Tracking Based Selection Technique for Head Mounted Displays (HMD)".

International Preliminary Report on Patentability for PCT/US2014/065778 dated May 26, 2016 entitled "Text Selection Using HMD Head-Tracker and Voice-Command".

International Preliminary Report on Patentability for PCT/US2014/065771dated May 26, 2016 entitled "Automatic Speech Recognition (ASR) Feedback for Head Mounted Displays (HMD)".

International Preliminary Report on Patentability for PCT/US2014/065788 dated May 26, 2016 entitled "Head-Tracking Based Selection Technique for Head Mounted Displays (HMD)".

* cited by examiner

TICK MOVEMENT

NODDING MOVEMENT

HEAD TRACKING BASED GESTURE CONTROL TECHNIQUES FOR HEAD MOUNTED DISPLAYS

RELATED APPLICATIONS

This application claims the benefit of U.S. Provisional Application No. 61/905,088, filed on Nov. 13, 2013.

This application is related to the following U.S. patent applications:

U.S. patent application Ser. No. 14/540,905, filed Nov. 13, 2014, entitled "Text Selection Using HMD Head-tracker and Voice-Command."

U.S. patent application Ser. No. 14/540,939, filed Nov. 13, 2014, entitled "Head-Tracking Based Selection Technique For Head Mounted Displays (HMD)."

U.S. patent application Ser. No. 14/540,943, filed Nov. 13, 2014, entitled "Automatic Speech Recognition (ASR) Feedback For Head Mounted Displays (HMD)."

The entire teachings of the above applications are incorporated herein by reference.

BACKGROUND OF THE INVENTION

Mobile computing devices, such as notebook PC's, smart phones, and tablet computing devices, are now common tools used for producing, analyzing, communicating, and consuming data in both business and personal life. Consumers continue to embrace a mobile digital lifestyle as the ease of access to digital information increases with high-speed wireless communications technologies becoming ubiquitous. Popular uses of mobile computing devices include displaying large amounts of high-resolution computer graphics information and video content, often wirelessly streamed to the device. While these devices typically include a display screen, the preferred visual experience of a high-resolution, large format display cannot be easily replicated in such mobile devices because the physical size of such device is limited to promote mobility. Another drawback of the aforementioned device types is that the user interface is hands-dependent, typically requiring a user to enter data or make selections using a keyboard (physical or virtual) or touch-screen display. As a result, consumers are now seeking a hands-free high-quality, portable, color display solution to augment or replace their hands-dependent mobile devices.

SUMMARY OF THE INVENTION

Recently developed micro-displays can provide large-format, high-resolution color pictures and streaming video in a very small form factor. One application for such displays can be integrated into a wireless headset computer worn on the head of the user with a display within the field of view of the user, similar in format to eyeglasses, audio headset or video eyewear.

A "wireless computing headset" device, also referred to herein as a headset computer (HSC) or head mounted display (HMD), includes one or more small, high resolution micro-displays and associated optics to magnify the image. The high resolution micro-displays can provide super video graphics array (SVGA) (800×600) resolution or extended graphic arrays (XGA) (1024×768) resolution, or higher resolutions known in the art.

A wireless computing headset contains one or more wireless computing and communication interfaces, enabling data and streaming video capability, and provides greater convenience and mobility through hands dependent devices.

For more information concerning such devices, see co-pending patent applications entitled "Mobile Wireless Display Software Platform for Controlling Other Systems and Devices," U.S. application Ser. No. 12/348,648 filed Jan. 5, 2009, "Handheld Wireless Display Devices Having High Resolution Display Suitable For Use as a Mobile Internet Device," PCT International Application No. PCT/US09/38601 filed Mar. 27, 2009, and "Improved Headset Computer," U.S. Application No. 61/638,419 filed Apr. 25, 2012, each of which are incorporated herein by reference in their entirety.

The described embodiments demonstrate how users can use natural or intuitive body movements or gestures to communicate with computers in a more natural way. A gesture may be a non-verbal communication of the body that contains information. For example, waving one's hand may convey a message.

Head gestures are a natural and efficient way to respond to dialog boxes, especially when the user is already performing a different task. The movement in question must be a small, to prevent any discomfort to the user, while being clearly decipherable by the system.

The present invention relates to gesture based interaction techniques to control Head-Mounted Displays (HMD). In particular, embodiments provide a head gesture-based recognition system where notification dialog boxes can be acknowledged by head nodding or ticking and question dialog boxes can be answered by head nods or head shakes.

In one aspect, the invention is a headset computer system, including a headworn display unit. The headset computer system further includes a digital processor coupled to the display unit, and a head tracker operatively coupled to the display unit and processor. The processor may be configured to be responsive to any one of a set of predefined user head gestures detected by the head tracker for making user selections.

In one embodiment, the predefined head gestures include one or more of a tick movement, a head nodding movement, a head shaking movement, and a head swiping movement. The head swiping movement may be one of a left swiping movement and a right swiping movement.

In another embodiment, the display unit presents a notification dialog box to the user, and the processor interprets a particular user head gesture as the user's acknowledgement of the notification dialog box. The particular user head gesture may a tick gesture. The processor may interpret a tick performed from left to right as having a first meaning, and a tick performed from right to left has having a second meaning, although the processor may interpret ticks performed in any and all directions as having a common meaning.

In another embodiment, the display unit presents, to the user, a question dialog box having a first option and a second option. The processor may interpret a first predetermined gesture as a selection of the first option and the processor interprets a second predetermined gesture as a selection of the second option. In one embodiment, the first predetermined gesture is a head nod, and the second predetermined gesture is a head shake. In another embodiment, the first predetermine gesture is a head swipe to the left or a head swipe to the right, and the second predetermined gesture is a head swipe to the right or a head swipe to the left. In one embodiment, the head swipe to the left causes an indicator associated with the first option to transition from an empty state to a full state, and the head swipe to the right causes an indicator associated with the second option to transition from an empty state to a full state.

Another embodiment includes an automatic speech recognition (ASR) system configured to interpret utterances. The processor combines the interpreted utterances with the detected gesture to produce a computer interface input.

In another aspect, the invention is a method of making selections on a headset computer system. The method includes presenting, by a processor on a display unit, an object to be selected. The method further includes detecting, with a head tracker operatively coupled to the display unit and processor, a head gesture performed by a wearer of the headset computer system. The head gesture may be associated with selection of the object. The method also includes selecting the object upon detection of the head gesture.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

Figure 1A:
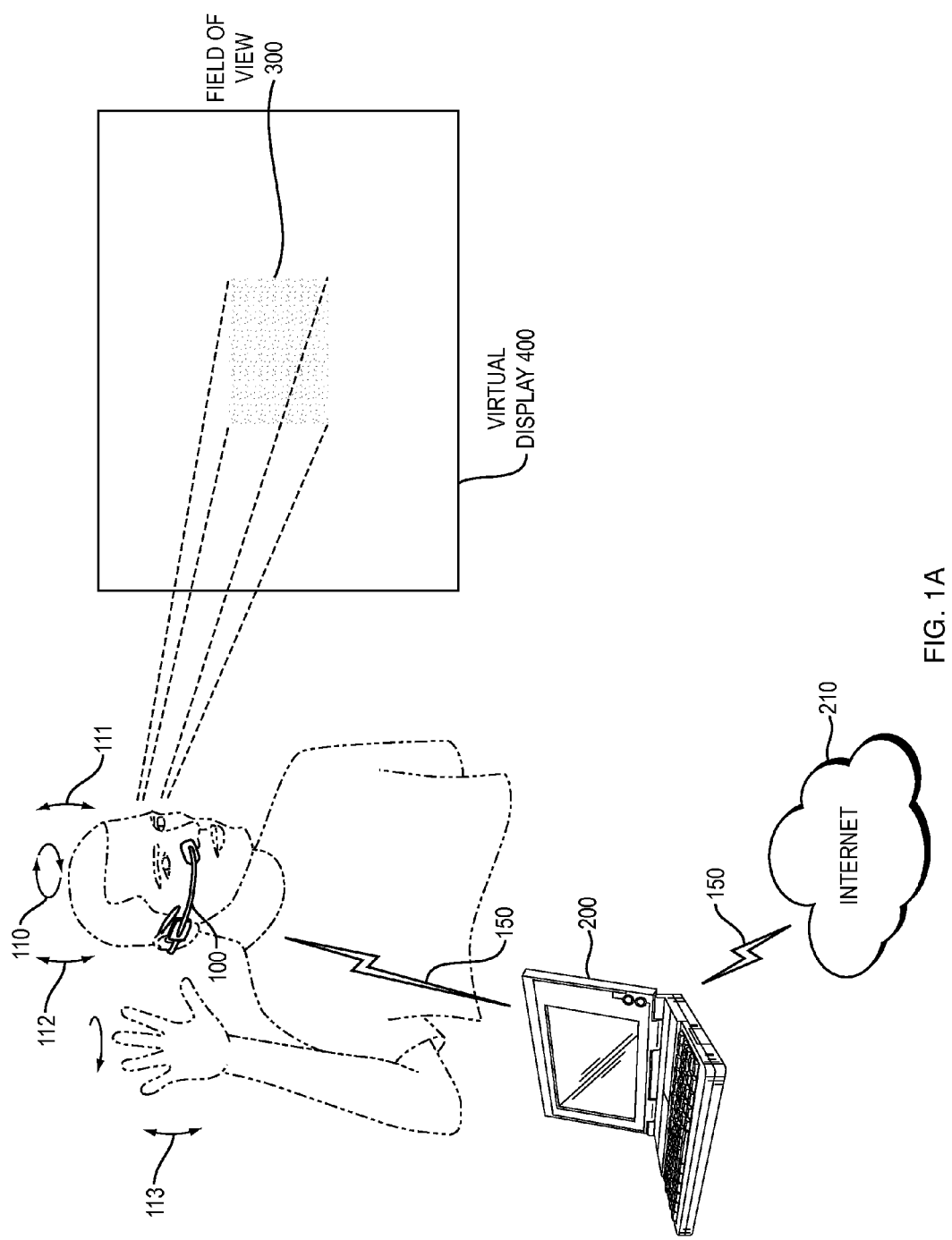
FIGS. 1A-1B are schematic illustrations of a headset computer cooperating with a host computer (e.g., Smart Phone, laptop, etc.) according to principles of the present invention.
Figure 1B:
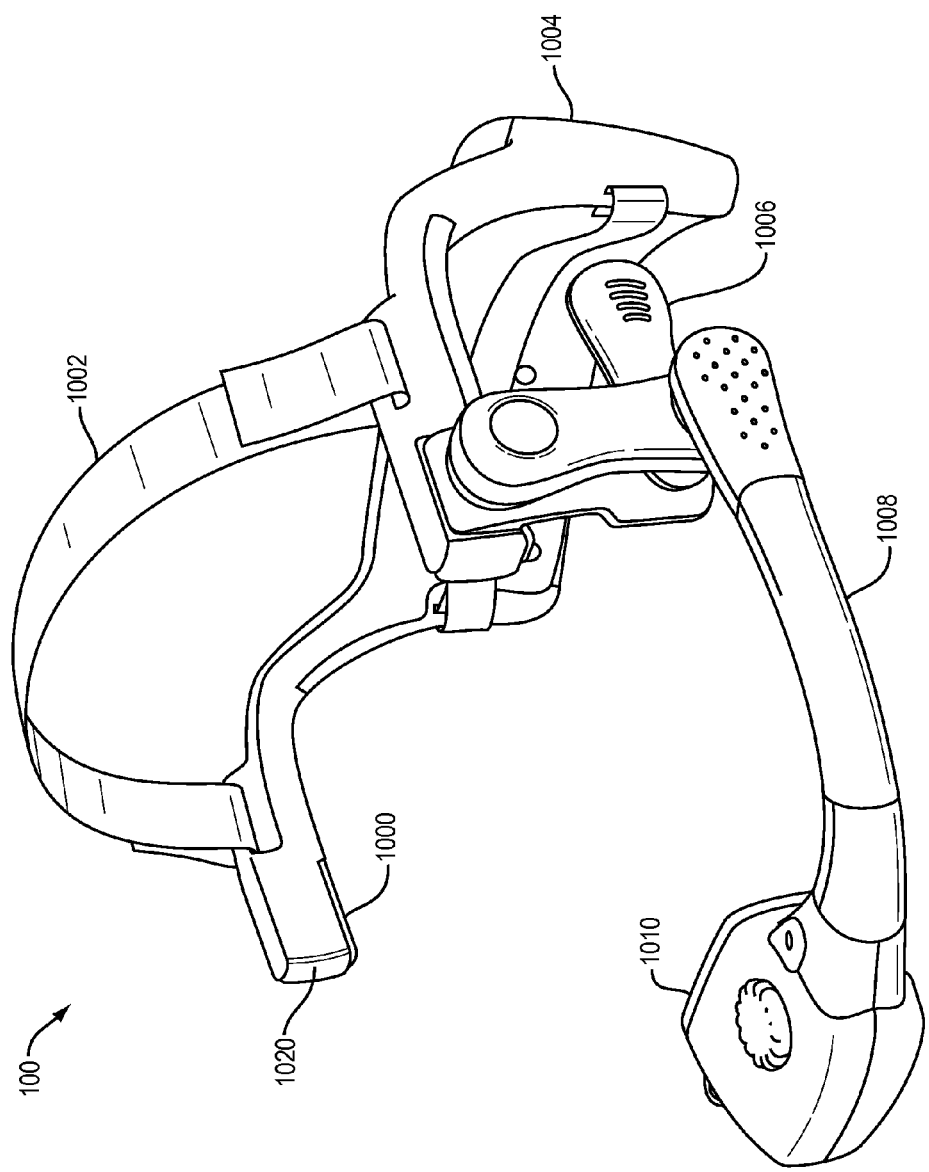

FIGS. 1A and 1B show an example embodiment of a wireless computing headset device 100 (also referred to herein as a headset computer (HSC) or head mounted display (HMD)) that incorporates a high-resolution (VGA or better) microdisplay element 1010, and other features described below.

HSC 100 can include audio input and/or output devices, including one or more microphones, input and output speakers, geo-positional sensors (GPS), three to nine axis degrees of freedom orientation sensors, atmospheric sensors, health condition sensors, digital compass, pressure sensors, environmental sensors, energy sensors, acceleration sensors, position, attitude, motion, velocity and/or optical sensors, cameras (visible light, infrared, etc.), multiple wireless radios, auxiliary lighting, rangefinders, or the like and/or an array of sensors embedded and/or integrated into the headset and/or attached to the device via one or more peripheral ports 1020 (FIG. 1B).

Typically located within the housing of headset computing device 100 are various electronic circuits including, a microcomputer (single or multicore processors), one or more wired and/or wireless communications interfaces, memory or storage devices, various sensors and a peripheral mount or mount, such as a "hot shoe."

Example embodiments of the HSC 100 can receive user input through sensing voice commands, head movements, 110, 111, 112 and hand gestures 113, or any combination thereof. A microphone (or microphones) operatively coupled to or integrated into the HSC 100 can be used to capture speech commands, which are then digitized and processed using automatic speech recognition techniques. Gyroscopes, accelerometers, and other micro-electromechanical system sensors can be integrated into the HSC 100 and used to track the user's head movements 110, 111, 112 to provide user input commands. Cameras or motion tracking sensors can be used to monitor a user's hand gestures 113 for user input commands. Such a user interface may overcome the disadvantages of hands-dependent formats inherent in other mobile devices.

The HSC 100 can be used in various ways. It can be used as a peripheral display for displaying video signals received and processed by a remote host computing device 200 (shown in FIG. 1A). The host 200 may be, for example, a notebook PC, smart phone, tablet device, or other computing device having less or greater computational complexity than the wireless computing headset device 100, such as cloud-based network resources. The headset computing device 100 and host 200 can wirelessly communicate via one or more wireless protocols, such as Bluetooth®, Wi-Fi, WiMAX, 4G LTE or other wireless radio link 150. (Bluetooth is a registered trademark of Bluetooth Sig, Inc. of 5209 Lake Washington Boulevard, Kirkland, Wash. 98033).

In an example embodiment, the host 200 may be further connected to other networks, such as through a wireless connection to the Internet or other cloud-based network resources, so that the host 200 can act as a wireless relay. Alternatively, some example embodiments of the HSC 100 can wirelessly connect to the Internet and cloud-based network resources without the use of a host wireless relay.

FIG. 1B is a perspective view showing some details of an example embodiment of a headset computer 100. The example embodiment HSC 100 generally includes, a frame 1000, strap 1002, rear housing 1004, speaker 1006, cantilever, or alternatively referred to as an arm or boom 1008 with a built in microphone, and a micro-display subassembly 1010.

A head worn frame 1000 and strap 1002 are generally configured so that a user can wear the headset computer device 100 on the user's head. A housing 1004 is generally a low profile unit which houses the electronics, such as the microprocessor, memory or other storage device, along with other associated circuitry. Speakers 1006 provide audio output to the user so that the user can hear information. Micro-display subassembly 1010 is used to render visual information to the user. It is coupled to the arm 1008. The arm 1008 generally provides physical support such that the micro-display subassembly is able to be positioned within the user's field of view 300 (FIG. 1A), preferably in front of the eye of the user or within its peripheral vision preferably slightly below or above the eye. Arm 1008 also provides the electrical or optical connections between the microdisplay subassembly 1010 and the control circuitry housed within housing unit 1004.

According to aspects that will be explained in more detail below, the HSC display device 100 allows a user to select a field of view 300 within a much larger area defined by a virtual display 400. The user can typically control the position, extent (e.g., X-Y or 3D range), and/or magnification of the field of view 300.

While what is shown in FIGS. 1A and 1B is a monocular microdisplay presenting a single fixed display element supported on the face of the user with a cantilevered boom, it should be understood that other mechanical configurations for the remote control display device 100 are possible.

Figure 2:
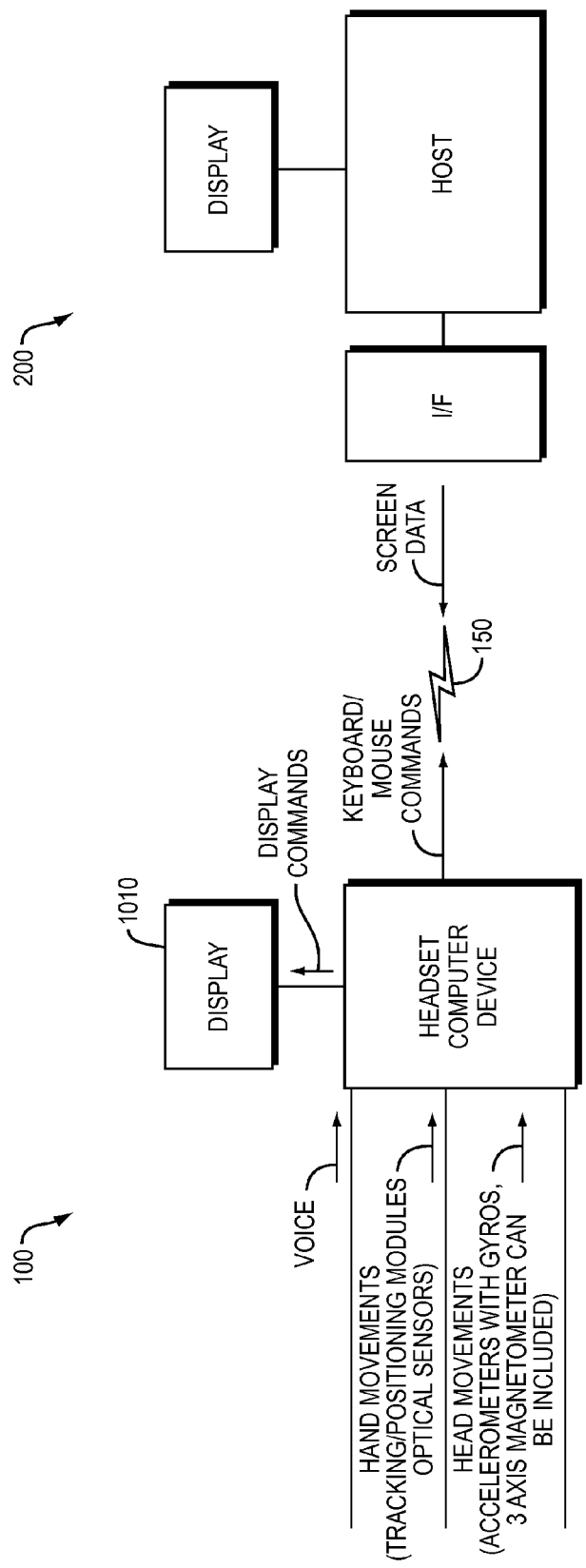
FIG. 2 is a block diagram of flow of data and control in the embodiment of FIGS. 1A-1B.

FIG. 2 is a block diagram showing more detail of an embodiment of the HSC (or HMD) device 100, host 200 and the data that travels between them. The HSC device 100 receives vocal input from the user via the microphone, hand movements or body gestures via positional and orientation sensors, the camera or optical sensor(s), and head movement inputs via the head tracking circuitry such as 3 axis to 9 axis degrees of freedom orientational sensing. These are translated by software (processors) in the HSC device 100 into keyboard and/or mouse commands that are then sent over the Bluetooth or other wireless interface 150 to the host 200. The host 200 then interprets these translated commands in accordance with its own operating system/application software to perform various functions. Among the commands is one to select a field of view 300 within the virtual display 400 and return that selected screen data to the HSC device 100. Thus, it should be understood that a very large format virtual display area might be associated with application software or an operating system running on the host 200. However, only a portion of that large virtual display area 400 within the field of view 300 is returned to and actually displayed by the micro display 1010 of HSC device 100.

The HSC 100 contains head-tracking capability. Head-tracking data is captured usually from an accelerometer as described above.

In one embodiment, the HSC 100 may take the form of the device described in a co-pending US Patent Publication Number 2011/0187640, which is hereby incorporated by reference in its entirety.

Head gestures can be useful for interacting with human-machine interface (HMI) elements. An HMI sensitive to head gestures can lead to more natural interaction between the user and the computer system.

Computer interfaces often interrupt a user's primary activity with a notification about an event or condition, which may or may not be relevant to the main activity.

In some systems, an HSC user must use their voice to acknowledge or attend to the notification before returning to the main activity. For example, the user might have to say "Confirm Selection" where an option is available, to prevent the system from executing commands that the user did not intend. This situation may arise when the Automatic Speech Recognition (ASR) interprets an utterance from the user as a selection or command that was not intended by the user.

The described embodiments enable the user to employ simple head gestures as confirmations, declinations and other appropriate responses associated with certain actions. The gestures may take many forms, and work in relation to a number of areas. One common use-case is nodding (i.e., head tilting to the front then to the back) or shaking the head (i.e., head turning to the left then to the right) to either confirm or deny a confirmation request from the HSC system 100 (such as 'Are you sure you wish to delete this document?').

The following descriptions outline two example embodiments for notification dialog boxes, and question dialog boxes. The example embodiments outline a few example gestures.

Notification Dialog Boxes

Notification dialog boxes are one-button (single button) windows that show information from an application, and wait for the user to acknowledge the information.

Typically the notification dialog box contains one "OK" button, the selection of which allows the user to acknowledge the associated information. There are a number of methods of confirming the information and closing the box. For example, using head-tracking capability, the user may manipulate a pointer to select the OK button. Alternatively, the HSC 100 may recognize a gesture, such as a particular head movement, as acknowledging the information.

Figure 3:
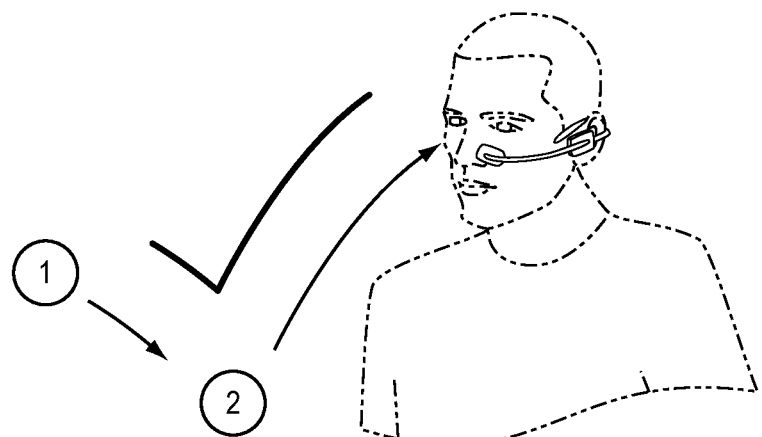
FIG. 3 is a schematic illustration of a tick head movement in embodiments.

In this example embodiment, the user traces a "tick" or "check" symbol with the movement of his head to indicate acknowledgement. FIG. 3 shows an example of such a head-movement. In one embodiment, the check movement of the head may be detected by HSC 100 as an acknowledgement when the head motion occurs in either direction (i.e., right-to-left or left-to-right). In other embodiments, the HSC 100 may interpret a check motioned in one direction as one gesture with first meaning, and interpret a check motioned in the opposite direction as another gesture with a second meaning (different from the meaning of the first gesture).

Question Dialog Boxes

Question dialog boxes are multiple button windows that display a question from the application and wait for positive or negative feedback from the user. This type of dialog box includes both confirmation and rejection buttons. For example, a question dialog box may contain two buttons—a "Yes" button and a "No" button.

Head nods and head shakes are a natural way in many cultures to signify positive and negative feedback, respectively. A user, therefore, with little or no training can efficiently use a system that recognizes head nods and shakes. Answering a dialog box using a head gesture makes it possible for users to keep focused on the task at hand.

Figure 4:
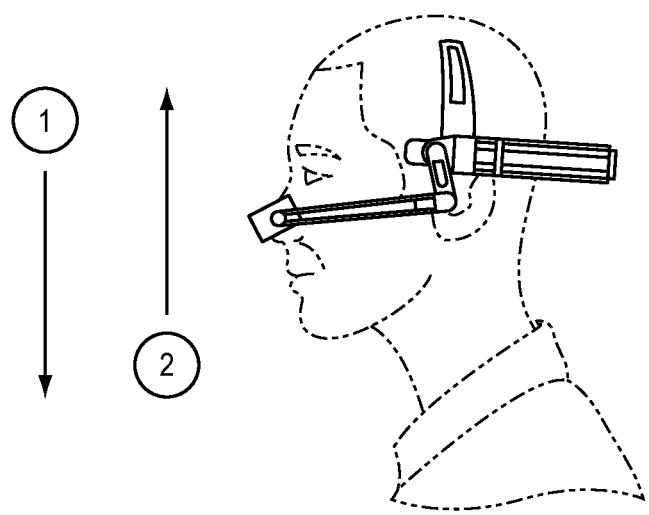
FIG. 4 is a schematic illustration of a head nodding movement in embodiments.

FIG. 4 is illustrative of nodding action in embodiments. Additional movements may commonly accompany the basic movements shown in FIG. 4, so embodiments may account for those movements. For example, as some people move their heads slightly upwards before the two steps shown in FIG. 4, some embodiments account for such extra steps in the specific iteration.

Two-Option Menus

Where two options, such as confirm or deny are shown to the user, one option is to use left/right head swiping.

Figure 5A:
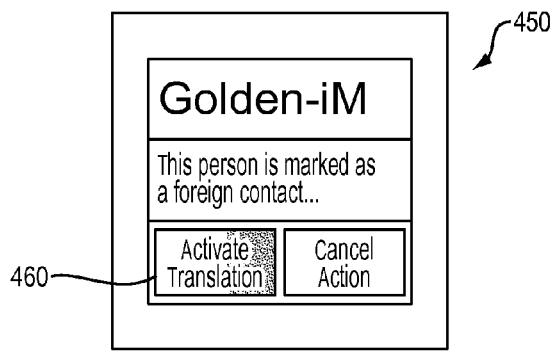
FIGS. 5A-5C and 6A-6C are schematic views of a graphical user interface in embodiments.
Figure 5B:
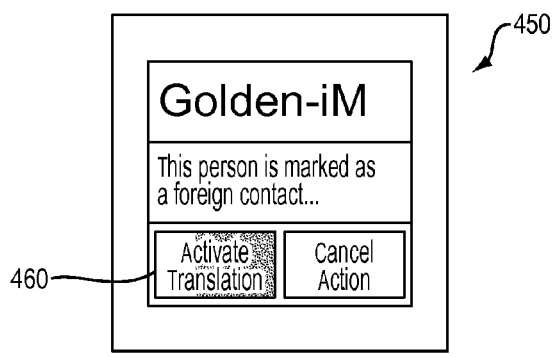
Figure 5C:
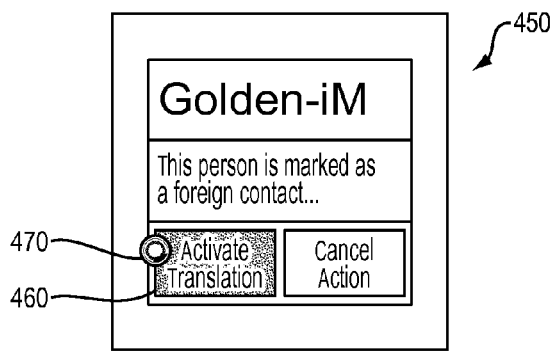

Head Swipe Left—FIGS. 5A-5C illustrate example embodiments. When the HSC 100 detects the user's head move to the left, the system 100 illustrates a button 460 on the left of the dialog box 450 filling with color. Embodiments next display a progress indicator 470 to the user to let him know how long he needs to hover the pointer for the command (of selectable object, e.g., button 460) to begin to execute.

The progress indicator 470 may be a circle or a vertical bar that fills with color, transitions from dark to light, or from shaded to unshaded (or vice versa). Once the progress indicator 470 is fully colored (or shaded, etc.), the object or action (associated with the button 460) is selected (i.e., the selection of the command is consummated). In some embodiments, the system 100 may fill or completely color a progress indicator 470 in about two seconds. In other embodiments, the amount of time necessary to completely fill the progress indicator may be selectable by the user (through, for example, a setup procedure of the HSC 100).

Figure 6A:
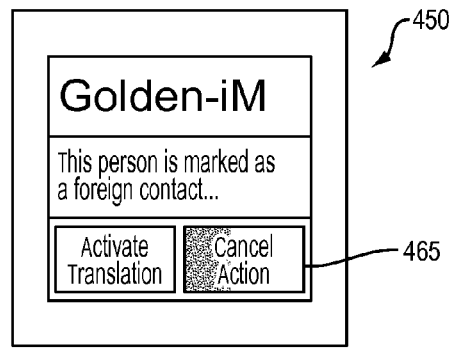
Figure 6B:
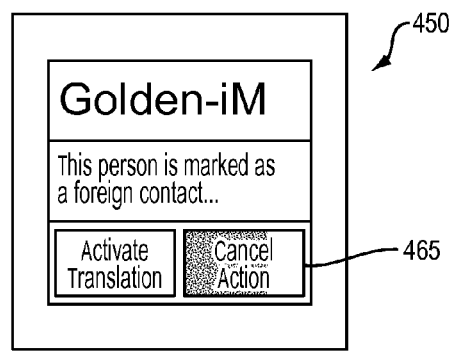
Figure 6C:
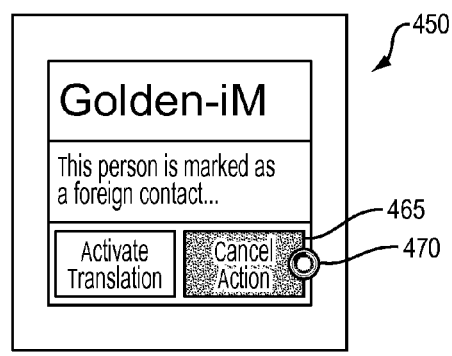

Head Swipe Right—As illustrated in FIGS. 6A-6C, the HSC 100 detects the user's head movement to the right. System 100 illustrates the button 465 on the right of the dialog box 450 filling with shading or color. System 100 next displays to the user a progress indicator 470, as described above, to let him know how long he needs to maintain the pointer over button 465 for the corresponding command to execute.

The progress indicator 470 may be a circle or a vertical bar that fills with color. Once the progress indicator 470 is full, the object or action (associated with button 465) is selected. Typically system 100 fills or completely colors the progress indicator 470 in about two seconds.

Example Gesture Descriptions

Head Nodding—A nod of the head is a gesture in which the head is tilted in alternating up and down arcs along the sagittal plane. In one embodiment of an HSC 100 system, a single quick head nod is sufficient to indicate 'Yes'.

Head Shaking—The Head Shake is a gesture in which the head is turned left and right along the transverse plane, horizontally, repeatedly in quick succession. In a HSC system 100 a two quick head shake movements, where the user's head turns to the left and then right, or vice versa, is sufficient to indicate 'No'.

Head Ticking—The head moving diagonally from top left to bottom right then top right (or in reverse), in the shape of a tick (i.e., a check mark).

Head Swipe Left/Right—The head is moved to the left or right and held in left/right extended position to activate an option.

This is not an exhaustive list and this disclosure relates to gesture use, utilizing the head-tracking capabilities generally.

Embodiments of this invention provide the user with an easy way to provide input to a HSC 100 where voice-commands cannot be used or are not the preference at that time.

Figure 7:
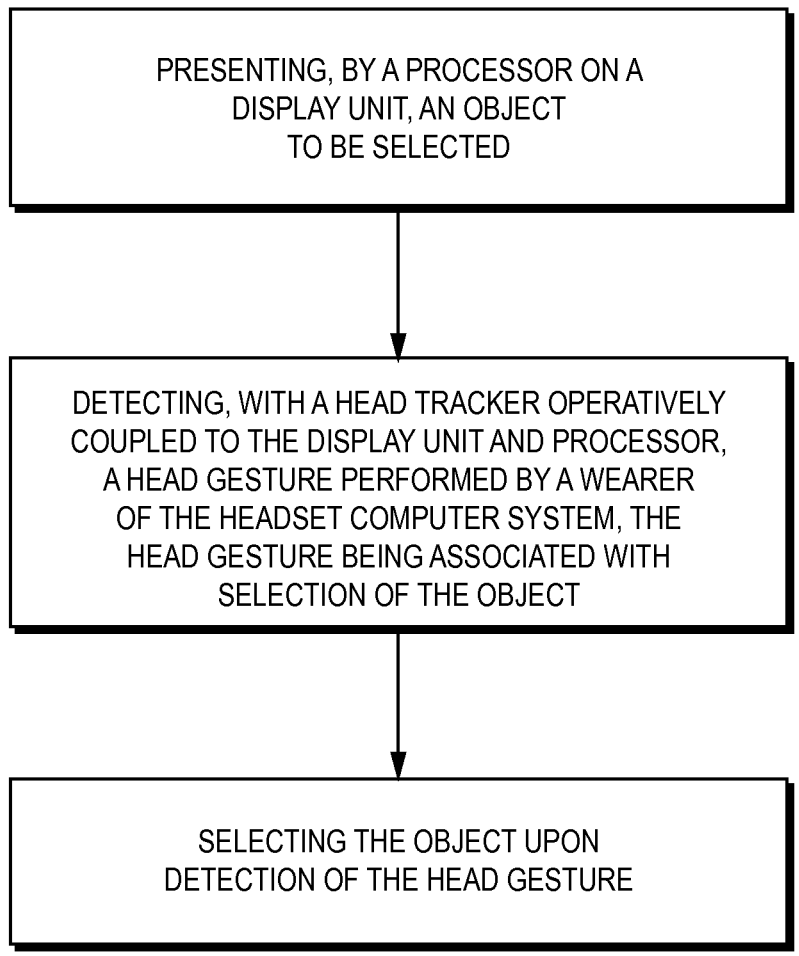
FIG. 7 is a flow diagram according to one embodiment of the invention.

FIG. 7 is a flow diagram according to one of the described embodiments.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:

1. A headset computer system, comprising:
a headworn display unit;
a digital processor coupled to the display unit; and
a head tracker operatively coupled to the display unit and processor, the processor configured to be responsive to a user head gesture detected by the head tracker, and to manipulate a pointer presented on the display unit, based on the detected user head gesture, to at least partially overlap a selected object, the selected object being one of a first object that corresponds to a first option and a second object that corresponds to a second option;
when the pointer overlaps the selected object:
(i) the selected object gradually fills over a period of time, and
(ii) a progress indicator is presented on the display in association with the selected object, and the progress indicator gradually fills over a period of time, such that when the progress indicator is completely filled, a command associated with the selected object is consummated.

2. The system of claim 1, wherein the user head gesture is one of a left traced check symbol and a right traced check symbol.

3. The system of claim 2, wherein the processor interprets the check symbol performed from left to right as having a first meaning, and the check symbol performed from right to left has having a second meaning.

4. The system of claim 2, wherein the display unit presents, to the user, a question dialog box having a first option and a second option, the processor interprets a first predefined user head gesture as a selection of the first option and the processor interprets a second predefined user head gesture as a selection of the second option.

5. The system of claim 4, wherein the first predefined user head gesture includes an additional gesture that commonly accompanies the first predefined head gesture, which the processor interprets as a part of the first predetermined head gesture.

6. The system of claim 5, wherein the additional gesture includes one of a head swipe to the left or a head swipe to the right.

7. The system of claim 4, wherein the head swipe to the left causes an indicator associated with the first option to transition from an empty state to a full state, and wherein the head swipe to the right causes an indicator associated with the second option to transition from an empty state to a full state.

8. The system of claim 1, wherein the period of time is selectable by a user of the headset computer system through a setup procedure of the headset computer system.

9. The system of claim 1, further including an automatic speech recognition (ASR) system configured to interpret utterances, wherein the processor combines the interpreted utterances with the detected gesture to produce a computer interface input.

10. A method of making selections on a headset computer system, comprising:
- presenting, by a processor on a display unit, a first object that corresponds to a first option and a second object that corresponds to a second option;
- detecting, with a head tracker operatively coupled to the display unit and processor, a head gesture performed by a wearer of the headset computer system;
- manipulating a pointer presented on the display unit, based on the detected user head gesture, to at least partially overlap a selected object, the selected object being one of a first object that corresponds to a first option and a second object that corresponds to a second option; and
- when the pointer overlaps the selected object:
   (i) filling the selected object gradually over a period of time, and
   (ii) presenting a progress indicator on the display in association with the selected object, and filling the progress indicator gradually over a period of time; and
   (iii) consummating a command associated with the selected object when the progress indicator is completely filled.

11. The method of claim 10, wherein the head gesture is one of a left traced check symbol and a right traced check symbol.

12. The method of claim 11, further including interpreting the check symbol performed from left to right as having a first meaning, and a interpreting the check symbol performed from right to left as having a second meaning.

13. The method of claim 11, further including presenting, to the user, a question dialog box having a first option and a second option, interpreting a first head gesture as a selection of the first option and interpreting a second head gesture as a selection of the second option.

14. The method of claim 13, wherein the first head gesture includes an additional gesture that commonly accompanies the first head gesture, which the processor interprets as a part of the first head gesture.

15. The method of claim 14, wherein the additional gesture includes one of a head swipe to the left or a head swipe to the right.

16. The method of claim 10, further including adjusting the period of time based on an input provided by a user of the headset computer system through a setup procedure of the headset computer system.

* * * * *